(12) United States Patent
Kim et al.

(10) Patent No.: US 6,466,290 B2
(45) Date of Patent: Oct. 15, 2002

(54) FRINGE FIELD SWITCHING MODE LCD

(75) Inventors: Hyang Yul Kim; Seung Hee Lee, both of Kyoungki-do (KR)

(73) Assignee: Hyundai Display Technology Inc., Kyoungki-do (KR)

( * ) Notice: Subject to any disclaimer, the term of this patent is extended or adjusted under 35 U.S.C. 154(b) by 56 days.

(21) Appl. No.: 09/725,783

(22) Filed: Nov. 29, 2000

(65) Prior Publication Data

US 2001/0005251 A1 Jun. 28, 2001

(30) Foreign Application Priority Data

Dec. 22, 1999 (KR) .............................. 99-60320

(51) Int. Cl.$^7$ ............................ G02F 1/1343
(52) U.S. Cl. ....................................... 349/141
(58) Field of Search ......................... 349/141

(56) References Cited

U.S. PATENT DOCUMENTS

| | | | | |
|---|---|---|---|---|
| 5,946,067 A | * | 8/1999 | Kim et al. | 349/141 |
| 6,128,061 A | * | 10/2000 | Lee et al. | 349/141 |
| 6,266,118 B1 | * | 7/2001 | Lee et al. | 349/141 |
| 6,297,866 B1 | * | 10/2001 | Seo et al. | 349/141 |

* cited by examiner

Primary Examiner—James A. Dudek
(74) Attorney, Agent, or Firm—Ladas & Parry

(57) ABSTRACT

Disclosed is a fringe field switching mode liquid crystal display (LCD) in which the direction of a fringe field produced at one unit pixel is orthogonal to the direction of a fringe field produced at each of unit pixels adjacent to the one unit pixel. The disclosed fringe field switching mode LCD includes counter electrodes and pixel electrodes arranged on a back substrate to produce a fringe field having horizontal elements parallel to data bus lines at one unit pixel while producing a fringe field having horizontal elements parallel to gate bus lines at each of unit pixels longitudinally and laterally adjacent to the one unit pixel. In this LCD, the rubbing axis of a back horizontal alignment film defines an angle of ±45±10° with respect to each of the gate bus lines.

8 Claims, 3 Drawing Sheets

US 6,466,290 B2

FRINGE FIELD SWITCHING MODE LCD

BACKGROUND OF THE INVENTION

1. Field of the Invention

The present invention relates to a liquid crystal display (LCD), and more particularly to a fringe field switching mode LCD having pixel electrodes and counter electrodes configured to produce a fringe field having horizontal components parallel to the surface of a back substrate thereof.

2. Description of the Related Art

An in-plane switching (IPS) mode LCD is well known, which has been developed by Hitachi, Ltd., Japan. Such an IPS mode LCD exhibits superior viewing angle characteristics over twisted nematic (TN) mode LCDs because it is driven based on a lateral field. However, the IPS mode LCD exhibits degraded characteristics in terms of the ratio of aperture and the transmittance of light. In order to improve the degraded characteristics of such an IPS mode LCD, a fringe field switching mode LCD has also been proposed.

The configuration of a conventional fringe field switching mode LCD is schematically illustrated in FIG. 1. FIG. 1 is a plan view of the conventional fringe field switching mode LCD.

As shown in FIG. 1, the conventional fringe field switching mode LCD includes a back substrate 1. Gate bus lines 2 and data bus lines 4 are arranged on the back substrate 1 in a matrix form to define unit pixels R, G, and B.

In the vicinity of an intersection where one gate bus line 2 and one data bus line 4 cross each other, a thin film transistor (TFT) is arranged, which serves to apply a signal voltage from the data bus line 4 to liquid crystal molecules in a liquid crystal cell or to cut off the application of the signal voltage.

In each unit pixel, a counter electrode 5 and a common electrode line 7 are formed. The counter electrode 5 has a rectangular plate shape, and a common electrode line 7 adapted to supply a common signal to the counter electrode 5. The counter electrode 5 is made of a transparent conductive material. The common electrode line 7 has a first electrode portion 7a extending in parallel to the gate bus lines 2, and a second electrode portion 7b extending from the first electrode portion 7a in parallel to the data bus line 4 while being arranged between the counter electrode 5 and the data bus line 4. The first electrode portion 7a is electrically in contact with the counter electrode 5 whereas the second electrode portion 7b is electrically insulated from the data bus line 4.

Also, in each unit pixel, a pixel electrode 9 is formed, which is made of a transparent conductive material. The pixel electrode 9 overlaps partially with the counter electrode 5 while being insulated from the counter electrode 5 by a gate insulating film not shown. The pixel electrode 9 has a plurality of uniformly-spaced comb portions 9a extending in parallel to the data bus lines 4, and a pair of bars 9b adapted to integrally connect the comb portions 9a together at opposite ends of each comb portion 9a, respectively.

Although not shown, the conventional fringe field switching mode LCD also includes a front substrate, a liquid crystal cell, a back polarization plate, and a front polarization plate. The front substrate faces the back substrate 1 in a state in which the liquid crystal cell is interposed between the front and back substrates. The back polarization plate is attached to the back substrate 1, and the front polarization plate is attached to the front substrate. The spacing between the front and back substrates is more than the spacing between the counter electrode 5 and the pixel electrode 9 in order to allow a fringe field to be generated in the liquid crystal cell. A back horizontal alignment film is formed between the back substrate 1 and the liquid crystal cell. The rubbing axis of the back horizontal alignment film defines an angle of ±12° with respect to the gate bus lines 2.

Now, the operation of the conventional fringe field switching mode LCD having the above mentioned configuration will be described where a voltage is applied between the counter electrode 5 and the pixel electrode 9 in one unit pixel.

Between the counter electrode 5 and the pixel electrode 9, a fringe field is produced which extends to the entire portion over the counter electrode 5 and over the pixel electrode 9. By virtue of this fringe field, the liquid crystal molecules in the liquid crystal cell are activated, thereby the screen of LCD being in a white state.

Since all liquid crystal molecules in the liquid crystal cell arranged over the counter electrode 5 and pixel electrode 9 are activated, it is possible to obtain a high aperture ratio and a high transmittance.

Meanwhile, the transmittance of an LCD can be expressed by the following expression:

$$T \approx T_0 \sin^2(2x) \cdot \sin^2(\Pi \cdot \Delta nd/\lambda)$$

where, T represents, the transmittance of the LCD, $T_0$ represents the transmittance of the LCD for a reference light, X represents an angle defined between the optical axis of liquid crystal molecules and the polarization axis of polarization plate, $\Delta n$ represents the refractive index anisotropy of the liquid crystal molecules, d represents the spacing between the front and back substrates, and $\lambda$ represents the wavelength of incident light.

Referring to the above expression, it can be found that a maximum transmittance is obtained when X equals $\Pi/4$ or $\Delta nd/\lambda$ equals $\lambda/2$. The refractive index anisotropy $\Delta n$ of the liquid crystal molecules depends on the viewing direction in which the screen of the LCD is viewed. When the refractive index anisotropy $\Delta n$ varies, $\Delta nd$ and $\lambda$ corresponding to a maximum transmittance are varied. For this reason, a color shift phenomenon occurs. That is, the color corresponding to the wavelength $\lambda$ varied depending on the viewing direction is displayed on the screen of the LCD.

For example, where the direction viewing the screen of the LCD corresponds to the short axis of the liquid crystal molecules, a decrease in $\Delta n$ occurs, and the wavelength of incident light corresponding to a maximum transmittance is shortened. As a result, the viewer is rendered to view blue color with a wavelength shorter than that of white light.

On the other hand, where the viewing direction corresponds to the long axis of the liquid crystal molecules, an increase in $\Delta n$ occurs, and the wavelength of incident light corresponding to a maximum transmittance is lengthened. Accordingly, the viewer is rendered to view yellow color with a wavelength longer than that of white light.

Such a color shift phenomenon occurs severely in the above mentioned fringe field switching mode LCD because the liquid crystal molecules in each unit pixel are oriented in the same direction in the white state.

SUMMARY OF THE INVENTION

Therefore, an object of the invention is to provide a fringe field switching mode LCD in which the pixel electrode and counter electrode of each unit pixel are formed such that a fringe field produced in one unit pixel has an orientation different from those of fringe fields respectively produced in adjacent unit pixels to solve the above mentioned problem involved in the related art,.

In accordance with the present invention, this object is accomplished by a fringe field switching mode liquid crystal display comprising a front substrate, a back substrate facing the front substrate, a liquid crystal cell interposed between the front and back substrates, a plurality of gate bus lines and a plurality of data bus lines arranged on the back substrate in a matrix form to define a plurality of unit pixels, a plurality of counter electrodes each formed at an associated one of the unit pixels and made of a transparent material, the counter electrodes to which desired common signal is applied, respectively, a plurality of pixel electrodes each formed in a region adjacent to an associated one of the counter electrodes to produce a fringe field having horizontal components in cooperation with the associated counter electrode, the pixel electrodes being made of a transparent material, a plurality of thin film transistors each connected to an associated one of the gate bus lines, an associated one of the data bus lines, and an associated one of the pixel electrodes and adapted to charge the associated pixel electrode based on an input signal from the associated gate bus line and an input signal from the associated data bus line, a front horizontal alignment film formed between the liquid crystal cell and the front substrate to have a rubbing axis of a desired direction, a back horizontal alignment film formed between the liquid crystal cell and the back substrate to have a rubbing axis of a desired direction, a back polarization plate formed at a back surface of the back substrate to have a polarization axis of desired direction, and a front polarization plate formed at a front surface of the front substrate to have a polarization axis extending in a desired direction, wherein the counter electrodes and the pixel electrodes are arranged on the back substrate such that the horizontal components of the fringe field produced at one of the unit pixels is orthogonal to the horizontal components of the fringe field produced at each of the unit pixels longitudinally and laterally adjacent to the one unit pixel.

And to improve response speed by increasing the rotating force of the liquid crystal molecules, the rubbing axis of the back horizontal alignment film defines an angle of ±45±10° with respect to each of the gate bus lines.

The above objects, and other features and advantages of the present invention will become more apparent after a reading of the following detailed description taken in conjunction with the accompanying drawings.

DESCRIPTION OF THE PREFERRED EMBODIMENTS

Now, preferred embodiments of the present invention will be described in conjunction with the annexed drawings.

Figure 1:
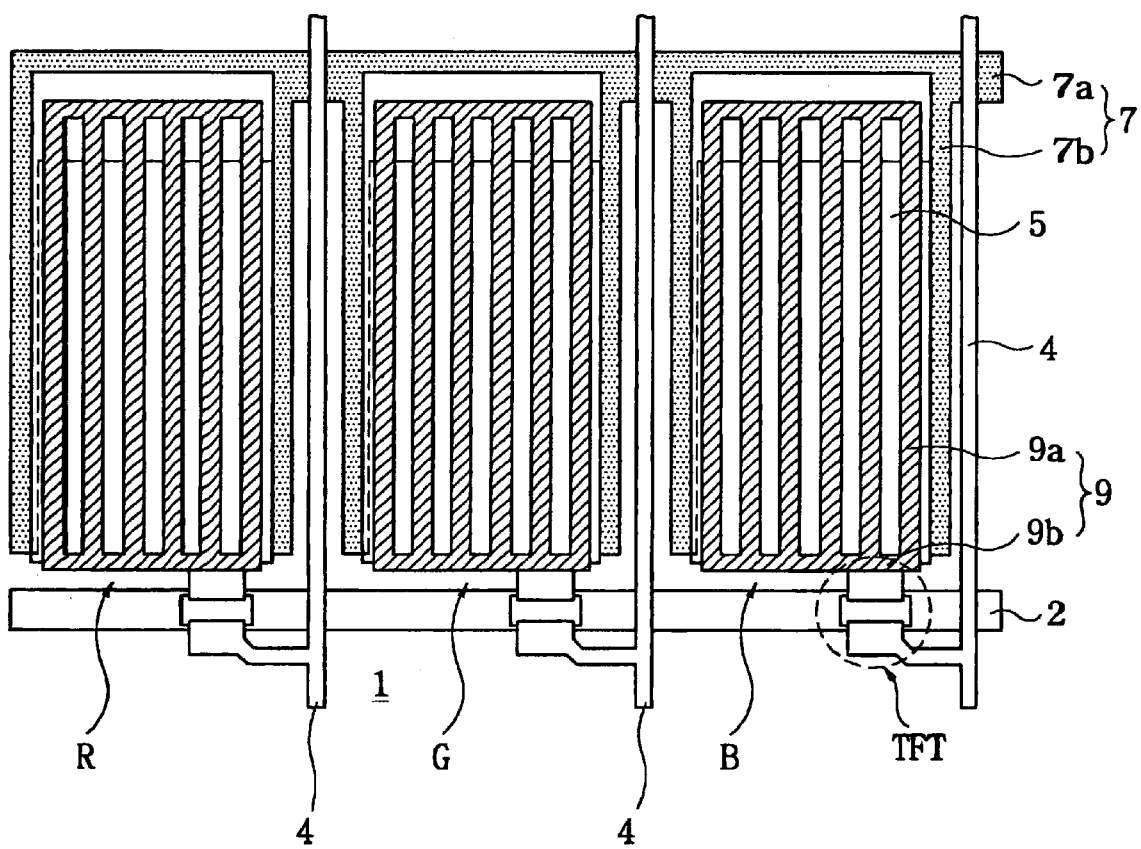
FIG. 1 is a plan view illustrating a conventional fringe field switching mode LCD.
Figure 2:
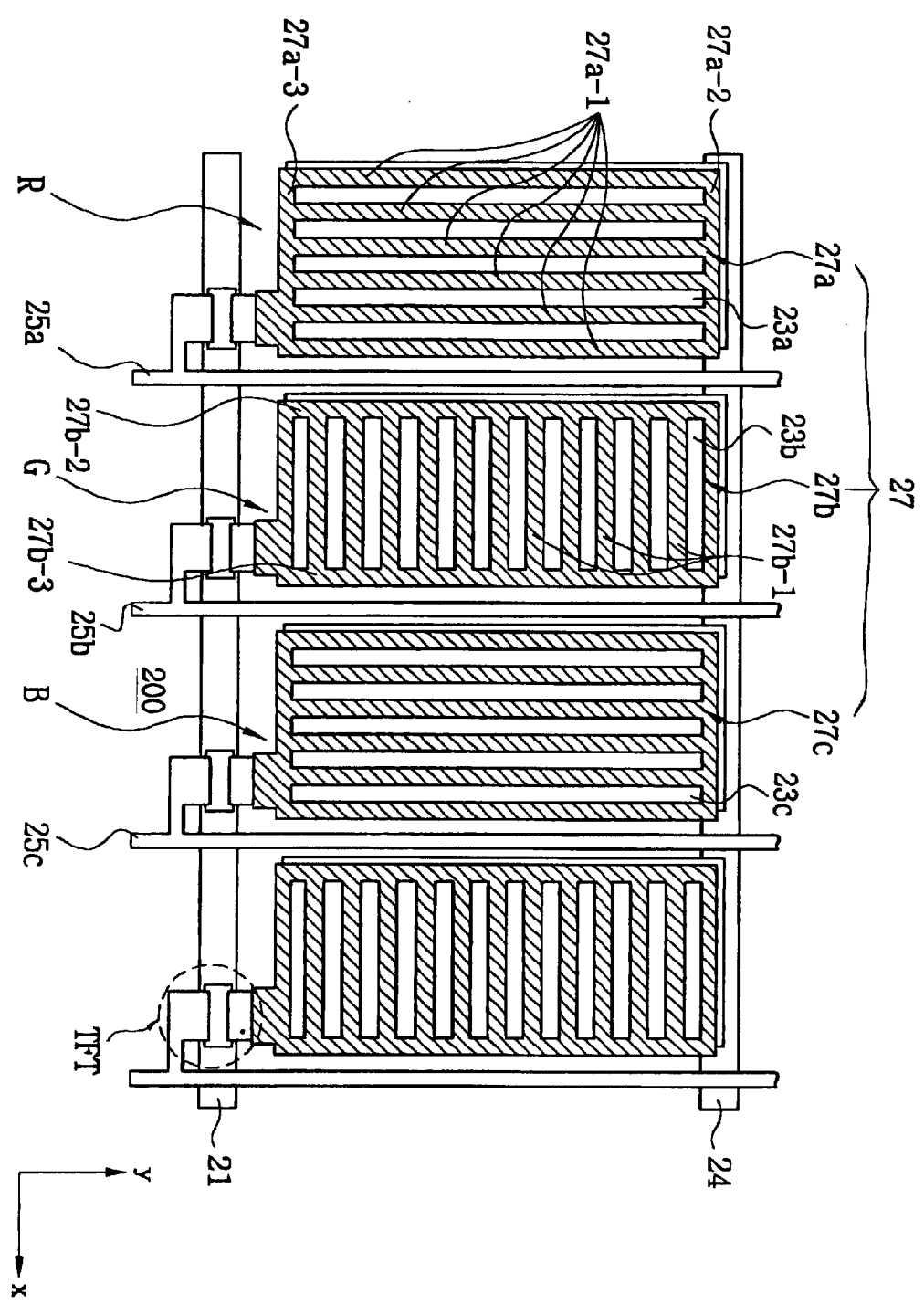
FIG. 2 is a plan view illustrating a fringe field switching mode LCD according to an embodiment of the present invention.

FIG. 2 is a plan view illustrating a fringe field switching mode LCD according to an embodiment of the present invention.

As shown in FIG. 2, the fringe field switching mode LCD according to the embodiment of the present invention includes a back substrate 200. On the back substrate 200, gate bus lines and data bus lines are arranged in a matrix form to define unit pixels. The gate bus lines are oriented in X direction and the data bus lines are oriented in Y direction. In FIG. 2, only one gate bus line 21 and three data bus lines 25a, 25b, and 25c, which define three unit pixels R, G, and B arranged in the same raw, are illustrated. The unit pixel R is a unit pixel corresponding to a red color filter, the unit pixel G is a unit pixel corresponding to a green color filter, and the unit pixel B is a unit pixel corresponding to a blue color filter. The gate bus line 21 and data bus lines 25a, 25b, and 25c are made of an opaque conductive metal material while being insulated from one another by a gate insulating film not shown.

In the vicinity of an intersection where the gate bus line 21 and each of the data bus lines 25a, 25b, and 25c cross each other, a TFT is arranged, which serves to apply a data signal from the associated data bus line 25a, 25b, or 25c to a liquid crystal layer or to cut off the application of the data signal.

In the unit pixels R, G and B, counter electrodes 23a, 23b, and 23c are formed. The counter electrodes 23a, 23b, and 23c has a rectangular plate shape respectively, which are made of a transparent conductive material such as an indium tin oxide (ITO). Each of the counter electrodes 23a, 23b, and 23c is spaced apart from the gate bus line 21 and an associated one of the data bus lines 25a, 25b, and 25c by a desired distance. The counter electrodes 23a, 23b, and 23c, which are arranged in the same row, are interconnected together by a common electrode line 24.

Also, kin the unit pixels R, G, and B, pixel electrodes 27a, 27b, and 27c are formed, which are made of a transparent conductive material. Each of the pixel electrodes 27a, 27b, and 27c is insulated from an associated one of the counter. electrodes 23a, 23b, and 23c by the gate insulating film.

The pixel electrode 27a has a plurality of uniformly-spaced longitudinal comb portions 27a-1 extending in parallel to the data bus line 25a, and a pair of lateral bars 27a-2 and 27a-3 adapted to interconnect the longitudinal comb portions 27a-1 to each other at opposite ends of each longitudinal comb portion 27a-1, respectively. The lateral bar 27a-2 overlaps with the counter electrode 23a. The lateral bar 27a-3 is electrically in contact with the associated TFT.

The pixel electrode 27c, the pixel electrode (not shown) formed at the unit pixels positioned over the pixel electrode 27b and the pixel electrode (not shown) formed at the unit pixels positioned below the pixel electrode 27b have the same configuration as the pixel electrode 27a.

The pixel electrode 27b has a plurality of uniformly-spaced lateral comb portions 27b-1 extending in parallel to the gate bus line 21, and a pair of longitudinal bars 27b-2 and 27b-3 adapted to interconnect the lateral comb portions 27b-1 to each other at opposite ends of each lateral comb portion 27b-1, respectively. Both the longitudinal bars 27a-2 and 27b-3 overlap with the counter electrode 23b. One of the outermost lateral comb portions 27b-1 is electrically in contact with the associated TFT, and the other outermost lateral comb portion 27b-1 overlaps with the counter electrode 23b.

In order to allow each of the unit pixels to obtain the same luminance, the spacing between adjacent lateral comb portions 27a-1 is set to be equal to the spacing between adjacent longitudinal comb portions 27b-1.

The counter electrodes 23a, 23b, and 23c are partially exposed through spaces defined among the lateral comb portions 27a-1 or longitudinal comb portions 27b-1 of the pixel electrodes 27a, 27b, and 27c, respectively. A fringe field is produced between the exposed portions of the counter electrodes 23a, 23b, and 23c and the lateral comb portions 27a-1 or longitudinal comb portions 27b-1 of the pixel electrodes 27a, 27b, and 27c, respectively. In order to allow the fringe field to be produced throughout the entire region of a liquid crystal cell included in the LCD, respective widths of each lateral comb portion 27a-1 and each longitudinal comb portion 27b-1 in the pixel electrodes 27a, 27b, and 27c, and respective widths of the exposed portions in the counter electrodes 23a, 23b, and 23c are set to be 3 to 6 $\mu$m.

Although not shown, the fringe field switching mode LCD according to the illustrated embodiment of the present invention also includes a front substrate, a liquid crystal cell, a back polarization plate, and a front polarization plate. The front substrate faces the back substrate 200 in a state in which the liquid crystal cell is interposed between She front and back substrates. The back polarization plate is attached to the back substrate 200, and the front polarization plate is attached to the front substrate.

The spacing between the front and back substrates is more than respective widths of each lateral comb portion 27a-1 and each longitudinal comb portion 27b-1, and respective widths of the exposed portions in the counter electrodes 23a, 23b, and 23c.

Each of the back substrate 200 and front substrate is an insulating substrate made of a transparent insulating material. The liquid crystal cell contains liquid crystal molecules having a negative or positive dielectric anisotropy Ac. Preferably, the liquid crystal cell exhibits a phase delay of 0.2 to 0.5 $\mu$m. A front horizontal alignment film is formed between the front substrate and the liquid crystal cell, and a back horizontal alignment film is formed between the back substrate 200 and the liquid crystal cell. Respective pretilted angles of front and back horizontal alignment films substrates are preferably 0.5 to 4°.

Figure 3:
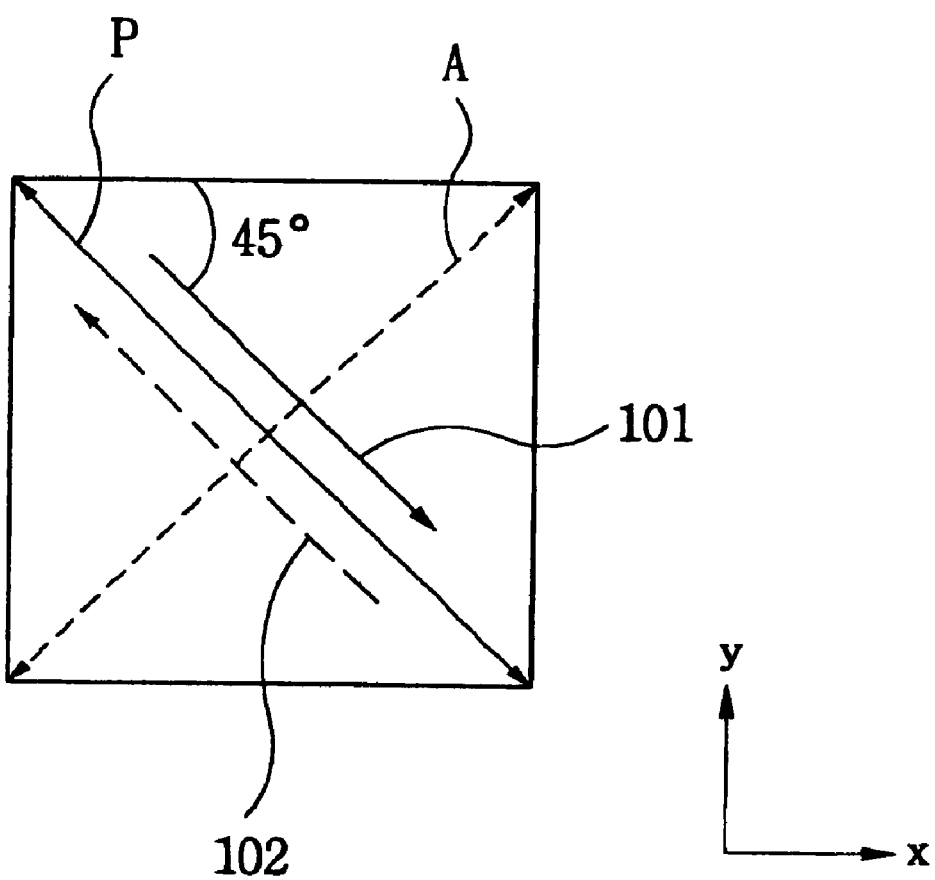
FIG. 3 is a schematic view illustrating the relations between the rubbing axes of alignment films and the polarization axes of polarization plates in the fringe field switching mode LCD according to the embodiment of the present invention.

As shown in FIG. 3, the back horizontal alignment film has a rubbing axis 101 set to define an angle of ±45±10° with respect to the extension direction of the gate bus line 21, that is, the x-axis direction. The front horizontal alignment film has a rubbing axis 102 preferably defining an angle of 180° with respect to the rubbing axis 101 of the back horizontal alignment film in order to obtain a high transmittance.

Preferably, he back polarization plate has a polarization axis P parallel to the rubbing axis 101 of the back horizontal alignment film. The front polarization plate preferably has a polarization axis A orthogonal to the polarization axis P of the back polarization plate.

The operation of the fringe field switching mode LCD having the above mentioned configuration will now be described. For the convenience of description, it is assumed that the dielectric anisotropy of the liquid crystal molecules is positive.

Under the condition in which no image signal is applied to the data bus lines 25a, 25b, and 25c, no fringe field is produced between the counter electrodes 23a, 23b, and 23c and the pixel electrodes 27a, 27b, and 27c. In this state, accordingly, the liquid crystal molecules in the liquid crystal cell are oriented in parallel to the surfaces of the front substrate and back substrate 200 by the front and back horizontal alignment films in such a fashion that the each liquid crystal molecule is arranged with its long axis in parallel to the corresponding rubbing axis 101 or 102. In such an arrangement state of the liquid crystal molecules, light passing through the back polarization plate are maintained in its polarized state while passing through the liquid crystal cell, so that they cannot pass through the front polarization plate. As a result, the screen of the LCD is in a dark state.

When an image signal is applied to the data bus lines 25a, 25b, and 25c, respectively, a certain voltage difference is generated between each of the counter electrodes 23a, 23b, and 23c and an associated one of the pixel electrodes 27a, 27b, and 27c, so that a fringe field is produced in each of the unit pixels R, G, and B. That is, a fringe field is produced between the longitudinal comb portions 27a-1 of the pixel electrode 27a and the exposed portions of the counter electrode 23a. This fringe field has horizontal components parallel to the gate bus line 21. Between the lateral comb portions 27b-1 of the pixel electrode 27b and the exposed portions of the counter electrode 23b, a fringe field having horizontal components parallel to the data bus lines 25 is produced. At the unit pixel B, a fringe field exhibiting the same orientation as that of the unit pixel R is produced. The liquid crystal molecules of the unit pixels R, G and B are rearranged so that the long axis of each liquid crystal molecule is parallel to the horizontal components of an associated one of the fringe fields. Accordingly, the liquid crystal molecules in the liquid crystal cell are grouped into a liquid crystal molecule group consisting of liquid crystal molecules oriented in the fringe field direction parallel to the data bus lines 25a, 25b and 25c and a liquid crystal molecule group consisting of liquid crystal molecules oriented in the fringe field direction parallel to the gate bus line 21. Thus, the liquid crystal cell has a double-domain arrangement of the liquid crystal molecules. In this arrangement state of the liquid crystal molecules, light passing through the back polarization plate changes its polarization state while passing through the liquid crystal cell, so that it can pass through the front polarization plate. As a result, the screen of the LCD is rendered to be in a white state.

The previously described versions of the present invention have many advantages, including the following advantages.

First, the refractive index anisotropy of the liquid crystal molecules is compensated to consider all unit pixels R, G, and B in a body because the liquid crystal molecules have symmetric arrangement, in the white state of the screen in the LCD. Accordingly, a color shift phenomenon is reduced.

Second, an improvement in response speed is achieved. The rotating force of a liquid crystal molecule, N, can be described by an expression "$N=\frac{1}{2}\Delta\epsilon \times E^2 \times \sin^2 2\Phi$" where $\Delta\epsilon$ represents the dielectric anisotropy of the liquid crystal molecule, E represents the intensity of an electric field, and $\Phi$ represents the angle defined between the long axis of the liquid crystal molecule and the electric field. In accordance with this expression, the rotating force N of the liquid crystal molecule is proportional to the angle $\Phi$ defined between the long axis of the liquid crystal molecule and the electric field. Accordingly, an improvement in response speed can be achieved by increasing the angle $\Phi$ defined between the long axis of the Liquid crystal molecule and the electric field, over that of conventional LCDs.

Although the present invention has been described in considerable detail with reference to certain preferred versions thereof, other versions are possible.

For example, the spacing between adjacent lateral comb portions of each pixel electrode having lateral comb portions and the spacing between adjacent longitudinal comb portions of each pixel electrode having longitudinal comb portions may be different from each other.

Therefore, the spirit and scope of the appended claims should not be limited to the description of the preferred versions contained herein.

What is claimed is:

1. A fringe field switching mode liquid crystal display comprising a front substrate, a back substrate facing the front substrate, a liquid crystal cell interposed between the front and back substrates, a plurality of gate bus lines and a plurality of data bus lines arranged on the back substrate in a matrix form to define a plurality of unit pixels, a plurality of counter electrodes each formed at an associated one of the unit pixels and made of a transparent material, the counter electrodes to which desired common signal is applied, respectively, a plurality of pixel electrodes each formed in a region adjacent to an associated one of the counter electrodes to produce a fringe field having horizontal components in cooperation with the associated counter electrode, the pixel electrodes being made of a transparent material, a plurality of thin film transistors each connected to an associated one of the gate bus lines, an associated one of the data bus lines, and an associated one of the pixel electrodes and adapted to charge the associated pixel electrode based on an input signal from the associated gate bus line and an input signal from the associated data bus line, a front horizontal alignment film formed between the liquid crystal cell and the front substrate to have a rubbing axis of a desired direction, a back horizontal alignment film formed between the liquid crystal cell and the back substrate to have a rubbing axis of a desired direction, a back polarization plate formed at a back surface of the back substrate to have a polarization axis of a desired direction, and a front polarization plate formed at a front surface of the front substrate to have a polarization axis of a desired direction, wherein: the counter electrodes and the pixel electrodes are arranged on the back substrate such that the horizontal components of the fringe field produced at one of the unit pixels is orthogonal to the horizontal components of the fringe field produced at each of the unit pixels longitudinally and laterally adjacent to the one unit pixel, and the counter electrodes and the pixel electrodes are arranged on the back substrate such that the horizontal components of the fringe field produced at the one unit pixel is parallel to the data bus lines while the horizontal components of respective fringe fields of the adjacent unit pixels being parallel to the gate bus lines.

2. The fringe field switching mode liquid crystal display according to claim 1, wherein the rubbing axis of the back horizontal alignment film defines an angle of ±45±10° with respect to each of the gate bus lines.

3. The fringe field switching mode liquid crystal display according to claim 1, wherein:

each of the counter electrodes is formed in a plate shape;

the pixel electrode associated with each unit pixel producing the fringe field having horizontal components parallel to the data bus lines comprises a plurality of uniformly-spaced longitudinal comb portions extending in parallel to the data bus lines; and the pixel electrodes associated with each unit pixel producing the fringe field having horizontal components parallel to the gate bus lines comprises a plurality of uniformly-spaced lateral comb portions extending in parallel to the gate bus lines.

4. The fringe field switching mode liquid crystal display according to claim 3, wherein the spacing between adjacent ones of the lateral comb portions is equal to the spacing between adjacent ones of the longitudinal comb portions.

5. The fringe field switching mode liquid crystal display according to claim 3, wherein each of the lateral comb portions has a width of 3 to 6 $\mu$m, each of the longitudinal comb portions has a width of 3 to 6 $\mu$m, and each of the counter electrodes exposed between adjacent ones of the lateral and longitudinal comb portions in an associated one of the pixel electrodes has a width of 3 to 6 $\mu$m.

6. The fringe field switching mode liquid crystal display according to claim 3, wherein the rubbing axis of the back horizontal alignment film defines an angle of ±45±10° with respect to each of the gate bus lines.

7. The fringe field switching mode liquid crystal display according to claim 6, wherein the rubbing axis of the front horizontal alignment film defines an angle of 180° with respect to the rubbing axis of the back horizontal alignment film.

8. The fringe field switching mode liquid crystal display according to claim 7, wherein the polarization axis of the back polarization plate is parallel to the rubbing axis of the back horizontal alignment film, and the polarization axis of the front polarization plate is orthogonal to the polarization axis of the back polarization plate.

* * * * *